Patented Jan. 1, 1935

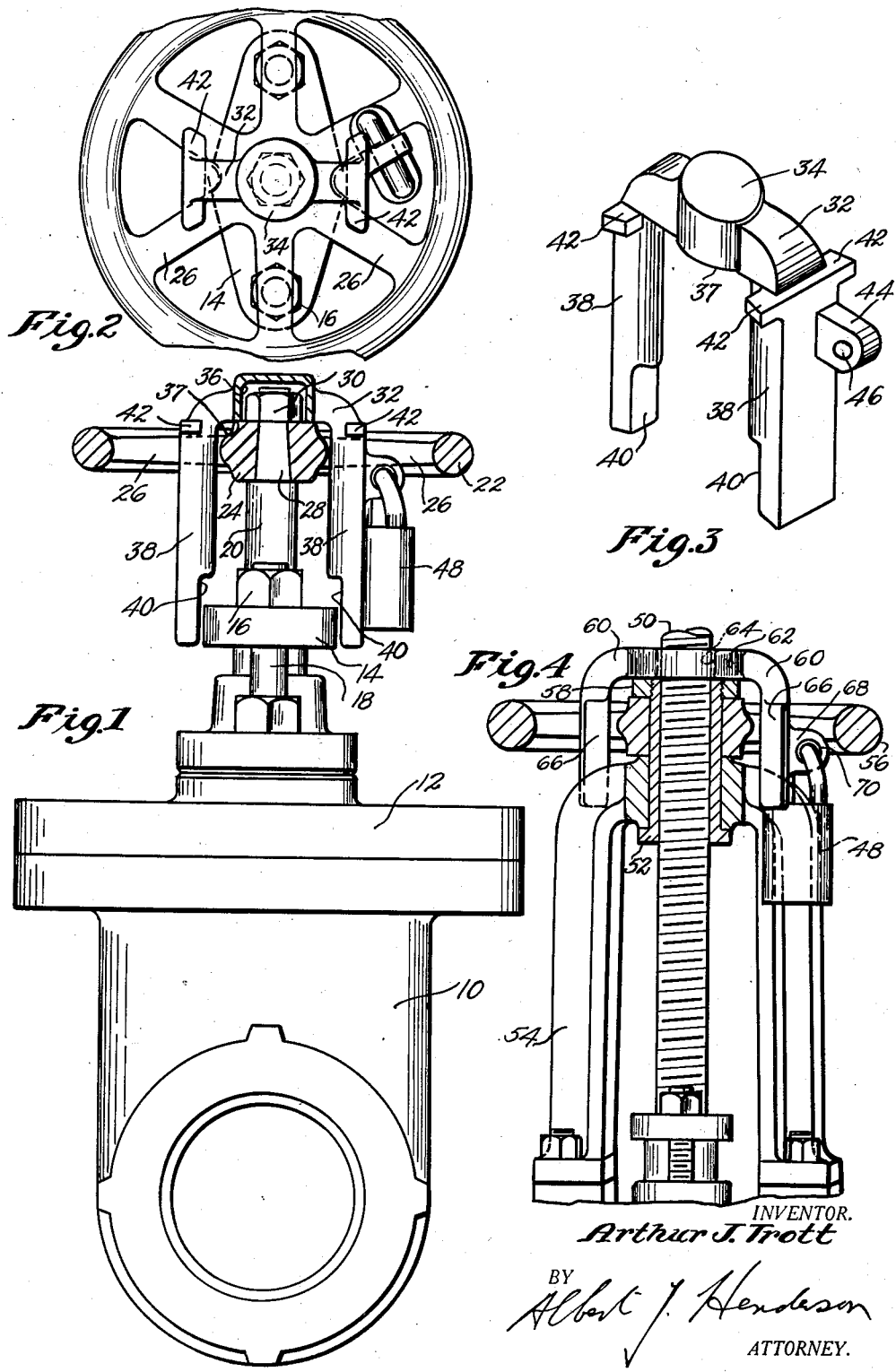

1,986,128

UNITED STATES PATENT OFFICE 1,986,128

LOCKING DEVICE

Arthur J. Trott, Greensburg, Pa., assignor to Walworth Patents Inc., Boston, Mass., a corporation of Massachusetts Application December 14, 1933, Serial No. 702,290

5 Claims. (Cl. 70—125)

This invention relates to locking devices and more particularly to locking devices for the handwheels of valves and the like.

One object of the invention is to prevent unauthorized rotation of the handwheel.

Another object of the invention is to permit a handwheel to be locked in any desired position.

Another object of the invention is to permit removal or replacement of the device on a handwheel without the use of tools.

Another object of the invention is to provide a device which will be applicable to existing structures without alteration.

Another object of the invention is to provide a device which will be simple in use and economical to manufacture.

Other objects and advantages will become apparent from the following description taken in connection with the following drawing, wherein Fig. 1 is a front elevation of a valve showing the handwheel in section with the device applied thereto.

Fig. 2 is a plan view of the same.

Fig. 3 is a perspective view of the locking device and

Fig. 4 is a fragmentary view, partly in section, of the handwheel and associated parts of a valve showing a modified form of the device applied thereto.

Referring more particularly to the drawing the locking device for illustrative purposes is shown in Fig. 1 as being applied to a gate valve of the non-rising spindle type. The valve comprises a casing 10 having a bonnet 12 adapted to receive a packing gland 14 of the usual substantially elliptical contour. The gland 14 is adjustable by means of the nuts 16 which engage studs 18 projecting from the bonnet 12 through the gland. A spindle 20 also projects from the bonnet 12 and is provided with the usual operating handle 22 having a hub 24 and a plurality of spaced arms 26 radiating therefrom. In Fig. 2 six such arms are shown but it will be understood that the device may be applied with equal facility to handwheels having any desired number.

In Figs. 1 and 2 the hub 24 of the handwheel is shown engaging a reduced portion 28 on the spindle and is retained in position thereon by means of a nut 30. All of the foregoing construction is conventional in valves of the type illustrated and further description is deemed unnecessary.

The locking device of this invention is designed to prevent unauthorized rotation of the spindle 20 to operate the valve and to accomplish this result means are provided to connect the handwheel to a stationary part of the valve, such as the gland 14. Furthermore, means are provided to prevent removal of the device by unauthorized parties.

Accordingly, the locking device comprises a bar portion 32 which is adapted to overlie the hub 24 of the handwheel. At the central portion of the bar 32 is an integral hollow cap 34 having an opening 36 therein forming an annular bearing surface 37 which is adapted to seat upon the hub 24 with the nut 30 enclosed within the cap. Extending substantially at right angles from each end of the bar 32 is a leg 38. The legs 38 are preferably wedge-shaped in cross section to seat between the arms of the handwheel as shown in Fig. 2. The legs 38 are made of sufficient length to extend from the handwheel 22 to the gland 14.

The inner faces of the legs are recessed as at 40 for a short distance from their terminal ends so that they are adapted to be positioned in contiguous relation with the sides of the gland 14 at the narrow portion thereof. It will be apparent from this construction that the portion of the legs between the recessed faces 40 and the bar 32 is adapted to partly overlie the gland 14 and prevent removal of the latter from the studs 18. Sufficient clearance is provided between the top face of the gland and the end of the recess 40 to allow for variations in the position of the gland due to varying adjustments of the valve packing. Preferably, the recess 40 is made of such length that the end thereof will be substantially level with the top of the stud 18 as shown in Fig. 2.

Bearing surfaces may be provided for each of the legs 38 in order to provide additional support against tilting of the locking member. These bearing surfaces are preferably in the form of lugs 42 which extend transversely from opposite sides of each of the legs 38 at their junction with the bar portion 32 and are adapted to seat upon adjacent arms 26 of the handwheel.

Suitable means are provided to receive retaining means when the device is positioned on the handwheel to prevent unauthorized removal therefrom. This means comprises a lug 44 extending from one of the legs 38 transversely of the lugs 42. This lug 44 is so located on the leg 38 that when the device is applied to a handwheel the lug 44 will lie adjacent the underside of one of the arms 26. A perforation 46 may be formed in the lug 44 to receive the staple of a common padlock 48.

This device may be applied to the handwheel to lock the valve in any desired position. It will be understood that it is only necessary to move the handwheel into such position that the spaces between adjacent arms 26 are opposite the narrow portion of the gland 14 as shown in Fig. 2. This feature does not form a dis-advantage as a considerable amount of back-lash is unavoidable where threaded spindles are used. It has been found, for instance, after trial on a considerable number of manufacturer's stock valves that when the valve is fully closed the handwheel can be moved on an average approximately one-sixth of a turn before the valve begins to open.

It will be apparent that the device is not confined to valves of the non-rising spindle type and in Fig. 4 the device is shown applied to a valve having a rising stem. As is well known to those skilled in the art, this type of valve has the stem 50 threaded for engagement with a nut 52 which is carried by a yoke 54. The handwheel 56 in this embodiment is seated upon the yoke 54 and retained in position by means of the nut 58 threadedly engaging the nut 52.

The locking device as adapted for use with this type of valve is but slightly modified from that previously described and comprises a bar portion 60 which has a boss 62 at its central portion provided with an aperture 64 through which the stem 50 may extend. The underside of the bar 60, as shown, is adapted to seat upon the nut 58.

A leg 66 depends from each end of the bar 60 and these legs are wedge-shaped in cross section for the purpose described in connection with the embodiment shown in Fig. 1. The legs are adapted to extend on opposite sides of the yoke 54 and will be moved into engagement therewith should the handwheel be rotated. Upon such engagement further rotation will be prevented and the total permissive movement will not be sufficient to move the valve member. A lug 68 projects from one of the legs and is adapted to lie adjacent the underside of one of the handwheel arms when the device is applied thereto. The lug 68 may be provided with a perforation 70 for the reception of suitable retaining means, such as the staple of the padlock 48.

It will be obvious that the device shown in Fig. 4 is not provided with bearing portions similar to those designated 42 in the embodiment shown in Fig. 1. The reason for this is that on this type of valve the bearing surface provided by the nut 58 is sufficiently ample to prevent tilting of the device when seated thereon. Furthermore, the legs 66 can be made considerably shorter than the corresponding legs in Fig. 1 as the yoke 54 extends much closer to the handwheel than does the gland 14 in the previously described type of valve.

From the foregoing it will be seen that an extremely simple device has been provided for locking a handwheel and that all the objects and advantages of the invention have been accomplished.

I claim:

1. In combination with a device having a handwheel provided with a hub and spaced arms, a bar portion overlying the hub and being seated thereon, a leg depending from said bar between said arms and engaging a stationary part of said device, and means on said leg in proximate relation with the underside of one of said arms for connection with a retaining element.

2. In combination with a device having a handwheel provided with a hub and spaced arms, a bar portion overlying the hub, a hollow cap integral with the central portion of said bar, the open end of said cap forming an annular seat engaging the hub, a wedge-shaped leg depending from each end of the bar and projecting between said spaced arms into contiguous relation with a stationary part of said device, and a perforated lug adjacent the underside of one of said arms.

3. In combination with a device having a handwheel provided with a hub and spaced arms, a bar portion overlying the hub, a hollow cap integral with the central portion of said bar, the open end of said cap forming an annular seat engaging the hub, a wedge-shaped leg depending from each end of the bar and projecting between said spaced arms, recessed portions on said legs adapted to engage a stationary part of said device, bearing portions extending transversely of the bar at the junction of the legs therewith, and a lug extending from one of said legs transversely of said bearing portions and located adjacent the underside of one of said arms, said lug having a perforation therein.

4. In combination with a device having a handwheel provided with a hub and spaced arms, a bar portion overlying the hub, a leg depending from each end of the bar between said arms for engagement with a stationary part of said device, and means intermediate the ends of one of said legs adapted to position a retaining element in proximate relation with an adjacent arm.

5. In combination with a device having a handwheel provided with a hub and spaced arms, a bar portion overlying the hub, a hollow cap integral with the central portion of said bar, the open end of said cap forming an annular seat engaging the hub, a leg depending from each end of the bar, bearing portions extending from the junction of the legs and the bar, and a lug extending at an angle to the longitudinal axis of the bar from intermediate the ends of one of said legs, said lug being adapted to position a retaining element in proximate relation with an adjacent arm.

ARTHUR J. TROTT.